United States Patent
Bottacini (10) Patent No.: US 9,958,042 B2
(45) Date of Patent: May 1, 2018

(54) ACTUATING DEVICE OF THE TYPE PROVIDED WITH AN ACTUATING ELEMENT AND SENSING MEANS FOR REVEALING THE POSITIONING OF THE ACTUATING ELEMENT

(71) Applicant: PNEUMAX S.p.A., Milan (IT)

(72) Inventor: Roberto Bottacini, Lurano (IT)

(73) Assignee: PNEUMAX S.P.A., Milan (IT)

( * ) Notice: Subject to any disclaimer, the term of this patent is extended or adjusted under 35 U.S.C. 154(b) by 225 days.

(21) Appl. No.: 15/092,837

(22) Filed: Apr. 7, 2016

(65) Prior Publication Data
US 2016/0319920 A1    Nov. 3, 2016

(51) Int. Cl.
| | |
|---|---|
| F16H 21/44 | (2006.01) |
| G01B 7/14 | (2006.01) |
| B25B 5/12 | (2006.01) |
| B25B 5/16 | (2006.01) |

(52) U.S. Cl.
CPC ............ *F16H 21/44* (2013.01); *B25B 5/122* (2013.01); *B25B 5/16* (2013.01); *G01B 7/14* (2013.01)

(58) Field of Classification Search
CPC ........... F16H 21/44; B25B 5/122; B25B 5/16; G01B 7/14
See application file for complete search history.

(56) References Cited

FOREIGN PATENT DOCUMENTS

| DE | 29903281 U1 | 7/1999 |
|---|---|---|
| EP | 1524081 A2 | 4/2005 |
| EP | 2327963 A2 | 6/2011 |
| EP | 2548700 A1 | 1/2013 |
| EP | 2692482 A2 | 2/2014 |

OTHER PUBLICATIONS

Hartnack, Kai, "International Search Report and Written Opinion of the International Searching Authority for International Application No. PCT/EP2015/059430)," European Patent Office, dated Dec. 18, 2015.

*Primary Examiner* — Zakaria Elahmadi
(74) *Attorney, Agent, or Firm* — Florek & Endres PLLC (57) ABSTRACT

An actuating device which comprises a housing inside of which a slidably displaceable actuating element and sensing means adapted to detect the positioning of the actuating element are provided, wherein the actuating element is coupled to at least one triggering part and the housing comprises at least one reading opening through which the positioning of the at least one triggering part at at least one sensing position can be detected; further wherein the sensing means are placed outside the housing at the reading opening and the at least one triggering part is completely housed inside the housing, the at least one reading opening being sealed with a cover made of a material adapted to allow the detection of the triggering part when placed at the at least one sensing position.

24 Claims, 6 Drawing Sheets

ACTUATING DEVICE OF THE TYPE PROVIDED WITH AN ACTUATING ELEMENT AND SENSING MEANS FOR REVEALING THE POSITIONING OF THE ACTUATING ELEMENT

BACKGROUND TO THE INVENTION

The present invention relates to an actuating device of the type provided with an actuating element and sensing means for revealing the positioning of the actuating element which is typically movable between an operative and a non-operative end position. In particular, the present invention relates to an actuating device typically used for handling elements during metalworking processes, e.g. in welding lines of the vehicle body construction industry.

In metalworking processes, the actuating devices are usually provided with sensors to detect the positioning of the actuating elements (at its operative or non-operative end position, respectively) and indicate it to a process computer in order to allow production automation. Typical actuating devices used in the vehicle body construction industry and provided with end position sensors are clamping units or power clamps, pivoting units or power pivots, pin units like e.g. retractable locating pin units, pin clamps, gripper units and marking units. By way of example, in clamping units the actuating element comprises a piston rod connected to a fork linkage. The group consisting of the piston rod and the fork linkage moves between two end positions, thereby displacing an articulated lever mechanism which, on its turn, causes a pivotable arm to rotate.

RELATED ART

The actuating devices nowadays used in the vehicle body construction industry, typically comprise a sensor at least partially housed inside the actuating device. The sensor usually comprises sensing elements positioned outside the sensor body at two predefined sensing positions. Furthermore, the actuating element comprises, is connected or coupled to triggering parts which are moved together with the actuating element in order to reach the one or the other sensing position when the actuating element reaches its operative or non-operative position, respectively. Such kind of actuating devices are known e.g. from DE 196 16 441 wherein the sensing elements are switches which can be alternatively energized by a cam switch (triggering part) connected to the piston rod when arranged in front of the respective switch. A displacement of the piston rod causes the cam switch to move from the first switch to the second switch so that the reaching of the two end positions of the piston rod can be detected.

According to a further kind of known actuating device, the sensor is substantially housed inside the actuating device and the sensing elements are arranged inside the sensor body, one next to the other. The sensing elements typically are of the inductive type and can be triggered by metal parts or, more generally, parts made of ferromagnetic material, displaced inside the actuating device by the actuating element itself or another movable part of the actuating device.

An actuating device of this kind is disclosed in DE 10 2013 001 004. The actuating device described in this document comprises two triggering parts, one connected to a bar slidably mounted inside the actuating device and one connected to the piston rod. Furthermore, the piston rod carries a dragging element which drags the slidable bar when the piston rod is moved towards its operative end position. This causes the triggering part mounted on the bar to reach its sensing position in front of a first sensing element. When the piston rod is brought into its non-operative position, the triggering part mounted on the same reaches its sensing position in front of the second sensing element. Furthermore, during the movement of the piston rod towards its non-operative position, the dragging element disengages from the bar which is returned to its initial position under the action of a spring. In this position, the triggering part mounted on the bar is not anymore arranged in front of the corresponding first sensing element.

Both the above described actuating devices provide for that the sensor is at least partially housed inside the actuating device. This implies that the housing of the actuating device has an opening for the insertion/extraction of the sensor.

Applicant realized that, accordingly, during replacement of the sensor (e.g. in case of malfunctioning of the same) the opening of the housing is in a non-sealed configuration which can lead to the entry of dirt or humidity inside the housing. Furthermore, also when the sensor is mounted inside the opening, an absolute sealing of the device housing cannot be assured because of the interstices between the housing and sensor surfaces in direct contact between each other. Therefore, a small quantity of dirt and humidity can always enter the device housing, thereby gradually deteriorating the moving parts of the device.

Furthermore the actuating device described in EP 2 548 700 is also known. This actuating device comprises an optical sensor lodged completely outside the housing of the actuating device. The optical sensor detects the position of a movable element projecting from the housing. The projecting element is slidably displaced between two sensing positions of the sensor by means of two dragging parts connected to the piston rod. When the dragging parts disengage from the projecting element, it is returned into a neutral non-sensing position by means of elastic means.

When the sensor is mounted on the housing, it completely covers the opening from which the projecting element protrudes.

Applicant realized, however, that even if the opening is covered by the sensor housing, a sealing of the device housing is not assured. Furthermore, when the sensor is replaced, the opening is laid open by the removal of the sensor thereby allowing dirt and humidity to enter inside the housing.

SUMMARY OF THE INVENTION

Accordingly, Applicant considered the problem of obviating the above mentioned drawbacks and, in particular, of providing an actuating device which assures an always constant and high sealing degree, even during replacement of the sensor.

Accordingly, the present invention relates to an actuating device comprising:
  a housing inside of which an actuating element is provided, the actuating element being slidably displaceable along a first axis between a first operative position and a second non-operative position and sensing means adapted to detect the positioning of the actuating element at at least one of the first or the second position;
  the actuating element being coupled to at least one triggering part so that a positioning of the actuating element at one of the first or the second position corresponds to the positioning of the at least one triggering part at at least one sensing position;

the housing comprising at least one reading opening through which the positioning of at least one triggering part at the at least one sensing position can be detected; the sensing means comprising at least one sensing element associated with the at least one sensing position in order to detect the positioning of at least one triggering part at the at least one sensing position, the sensing means being placed outside the housing and being connected to the same at the reading opening; characterized in that the at least one triggering part is completely housed inside the housing and the at least one reading opening is sealed with a cover made of a material adapted to allow the detection of the triggering part when placed at the at least one sensing position.

Throughout the present description and in the appended claims the expression "sensing position" refers to a position falling within the sensing range of a sensing element so that a detectable part located at the sensing position is effectively detected by the sensing element.

This advantageously allows achieving a constant and reliable sealing condition of the actuating device housing even during replacement of the sensor. In fact, the triggering parts are completely housed inside the device and the sensor is completely external to the device. Between the two interacting parts, an opening is provided which, however, is sealed with a material which still allows the sensor to detect the presence of the triggering parts. Therefore, during both, normal use and replacement of the sensor, the opening remains in a permanently sealed condition, even when the sensor is removed. Consequently, the entering of dirt or humidity into the device housing is mainly and constantly prevented, thereby assuring a longer life of the device moving parts.

Preferably, the cover is made of non-magnetic material, preferably non metallic material.

Advantageously, this kind of material makes it possible to use inductive sensing elements, since non-magnetic material does not interfere with the detection of metallic ferromagnetic materials operated by inductive sensors.

Preferably, the cover is made of an adhesive material, preferably an acrylic material.

Advantageously, this assures a reliable sealing of the reading opening so that no humidity or powder particles can enter inside the housing.

Preferably, the actuating element is coupled to two triggering parts movable towards and away from a respective first and second reading opening, each reading opening being coupled to a sensing element of the sensing means thereby defining a sensing position.

Preferably, the sensing means comprise two sensing elements placed out of alignment with respect of both, a vertical and a horizontal axis.

Expediently, this avoids that the displacement of a triggering part interferes with both sensing elements, thereby providing incorrect detections.

More preferably, the two sensing elements are placed along a line inclined diagonally with respect to the horizontal/vertical axis, preferably inclined by 45° or 60°.

This advantageously allows indifferently constraining the sensing means to the housing according to two reciprocally perpendicular configurations. This reveals to be particularly favorable in case the sensor needs to be connected to a slim housing. In this case, the sensor is mounted so as to have its larger side vertically oriented.

Preferably, the sensing elements are inductive sensing elements and the triggering parts are made of metallic material.

Preferably, the sensing means comprise a sensor body to which a connector for signal extraction is fixed by means of a screw, wherein the connector is adapted to be fixed to the sensor body according to a plurality of orientations.

This advantageously assures a higher flexibility degree, allowing to set the most suitable orientation of the connector according to the room available and the particular plant line design.

More preferably, the connector comprises a nut shaped so as to cooperate with the head of the screw in order to define a plurality of stable connections between the connector and the sensor body.

Even more preferably, the nut defines a plurality of seats adapted to house at least a portion of the screw head.

This advantageously assures a high stability of the positioning of the connector when it is constrained to the sensor body at an orientation corresponding to the screw head being stably housed inside one of the plurality of seats.

More preferably, the sensor body comprises a guiding groove which rotatably engages with the connector in order to allow reciprocal rotation between the connector and the sensor body when the screw is not fastened.

Preferably, the at least one triggering part is carried by at least one leverage pivotably connected to the housing, the movement of the actuating element causing the leverage to rotate.

More preferably, the leverage cooperates with a cam guide defined by the outer surface of the actuating element, wherein the displacement of the leverage along the cam guide puts the leverage into rotation.

Even more preferably, the leverage comprises a rotating pin engaging with the cam guide.

The particular moving mechanism chosen to displace the at least one triggering part leads to a high room saving inside the device housing, since the movement of the actuating element is converted into a very small movement of the triggering part.

Preferably, the at least one leverage cooperates with elastic means for returning into a rest position when disengaged from the cam guide.

Preferably, a first triggering part is carried by a first leverage pivotably connected to the housing so as to rotate about a first axis of rotation perpendicular to the sliding movement of the actuating element.

More preferably, a second triggering part is carried by a second leverage pivotably connected to the housing so as to rotate about a second axis of rotation parallel to the sliding movement of the actuating element.

Preferably, the second leverage cooperates with a portion of the actuating element having increased outer diameter which urges the second leverage against the action of the elastic means when the actuating element reaches at least one of the first or the second position.

More preferably, the portion with increased outer diameter is positioned at an axial position of the actuating element and extends along an annular portion or, preferably, all around the actuating element.

Preferably, the actuating device is a clamping unit and the actuating element comprises a piston rod connected to fork linkage, the actuating element acting on an articulated lever or cam mechanism for actuating the rotation of a pivotable arm.

Alternatively, the actuating element is a two-part rod and the at least one triggering part is a fastening pin of the two-part rod.

More preferably, the fastening pin is moved by the two-part rod between the first sensing position and an engagement position in which the fastening pin cooperates with a slide carrying a second triggering part and moves the slide to an end position in which the second triggering part is placed at the second sensing position.

Even more preferably, the slide cooperates with elastic means for returning into a rest position when disengaged from the fastening pin.

Preferably, the actuating device is a pin unit, preferably a retractable locating pin unit.

According to a further embodiment, the actuating element is at least one slidable rod comprising a circular slit and the at least one triggering part is connected to the at least one slidable rod by means of a half-annular connector engaged with the rod slit.

More preferably, the at least one triggering part is movable between the first sensing position and an engagement position in which it cooperates with a slide carrying a second triggering part and moves the slide to an end position in which the second triggering part is placed at the second sensing position.

Even more preferably, the slide cooperates with elastic means for returning into a rest position when disengaged from the fastening pin.

Preferably, the actuating device is a double rod pin unit.

BRIEF DESCRIPTION OF THE FIGURES

With reference to the attached drawings, further features and advantages of the present invention will be shown by means of the following detailed description of some of its preferred embodiments. According to the above description, the several features of each embodiment can be unrestrictedly and independently combined with each other in order to achieve the advantages specifically deriving from a certain combination of the same.

In the said drawings.

DETAILED DESCRIPTION OF CURRENTLY PREFERRED EMBODIMENTS OF THE INVENTION

Figure 1A:
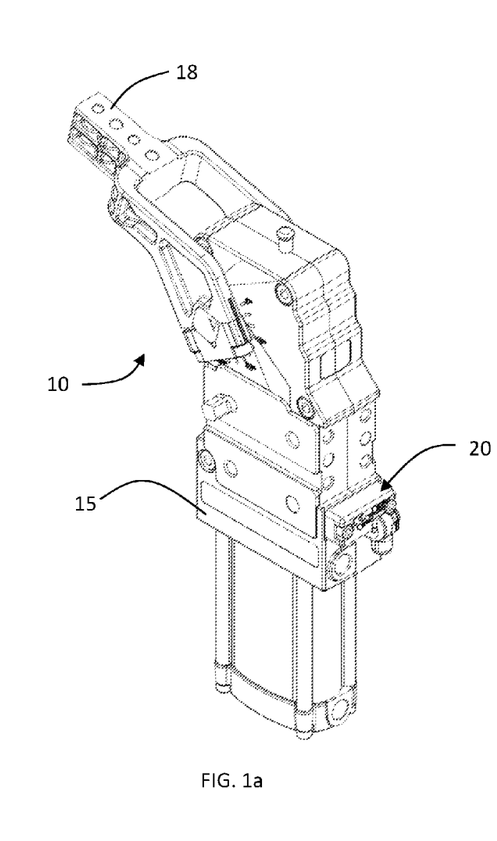
FIGS. 1a and 1b are perspective views of a first embodiment of the actuating device according to the invention in assembled and exploded configuration, respectively.
Figures 1B, 2:
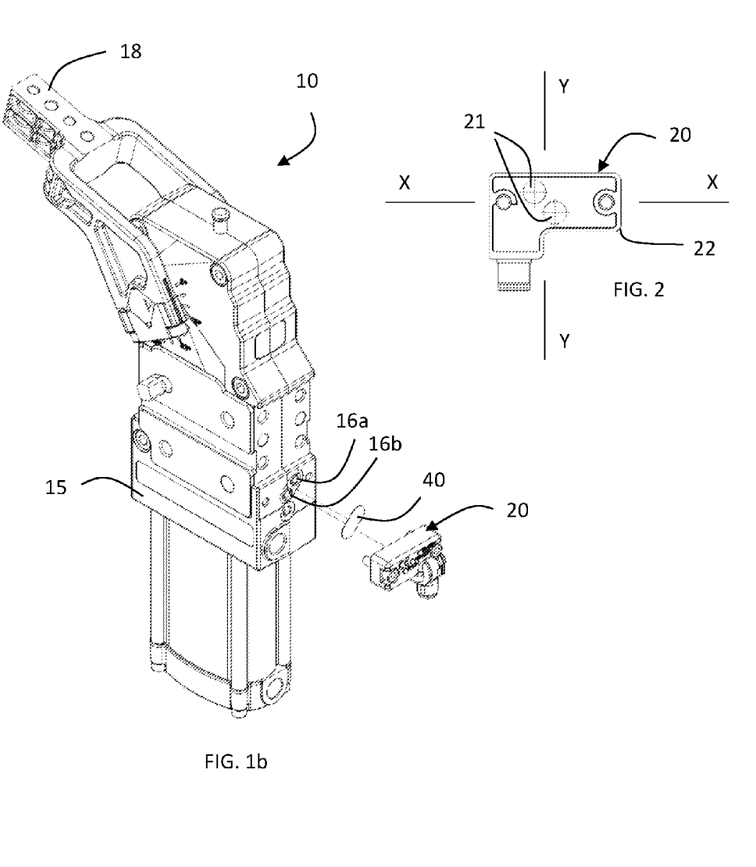
FIG. 2 is a rear plan view of a sensor of an actuating device according to the invention.

In FIGS. 1a and 1b a first embodiment of an actuating device according to the present invention is globally indicated with 10. The actuating device according to the first embodiment is a clamping unit.

The clamping unit 10 comprises a housing 15 inside of which an actuating element 11 is provided, wherein the actuating element comprises a piston rod connected to a fork linkage. The actuating element 11 acts on an articulated lever 17 or cam mechanism for actuating the rotation of a pivotable arm 18. The actuating element 11 is linearly displaceable along a first axis A, between a first operative 12 and a second non-operative 13 position, which correspond to the operative and a non-operative angular positions of the pivotable arm, respectively.

The clamping unit 10 also comprises sensing means 20 for revealing the positioning of the actuating element 11 at its first 12 or second 13 end position.

In the embodiment of FIGS. 1a and 1b, the sensing means comprise a sensor 20 mounted outside the housing 15 and fixedly constrained to the same 15. The sensor 20 comprises two inductive sensing elements 21 completely contained inside the sensor body 22.

As shown in FIG. 2, the sensing elements 21 are positioned out of alignment with respect of both, a vertical Y and a horizontal X axis and, particularly, the two sensing elements 21 are placed along a line inclined by 45° with respect to the said axes X and Y.

The sensor 20 is constrained to the device housing 15 so that the sensing elements 21 are positioned each at a reading opening 16a,16b obtained in the housing 15. Therefore, as shown in FIG. 1b, also the reading openings 16a,16b are positioned out of alignment with respect of both, the vertical Y and the horizontal X and particularly along a line inclined by 45° with respect to the said axes X and Y.

According to this configuration, each sensing element 21 defines a sensing position placed inside the housing 15, in front of the respective reading opening 16a,16b.

According to the present invention, the reading openings 16a,16b are sealed with a cover 40 made of a material adapted, on the one hand, to allow the sensing elements 21 to define sensing positions placed inside the device housing 15 and, on the other hand, to assure a proper permanent sealing of the housing 15. In case of inductive sensing elements 21, the cover 40 is made of non-magnetic, adhesive material. In detail, the cover 40 is made of acrylic material.

Figure 3A:
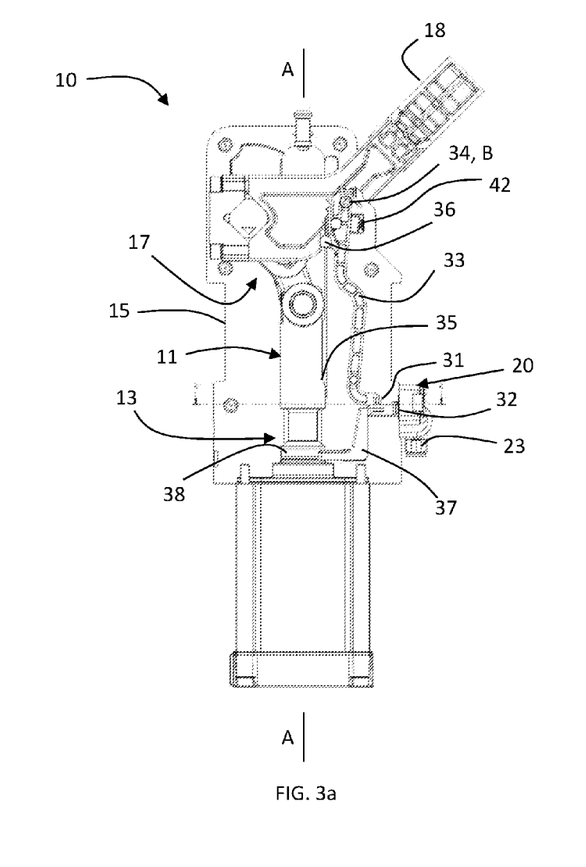
FIGS. 3a and 3b are two partially broken, sectional views of the actuating device of FIG. 1a with the actuating element in its operative and non-operative position, respectively.
Figure 3B:
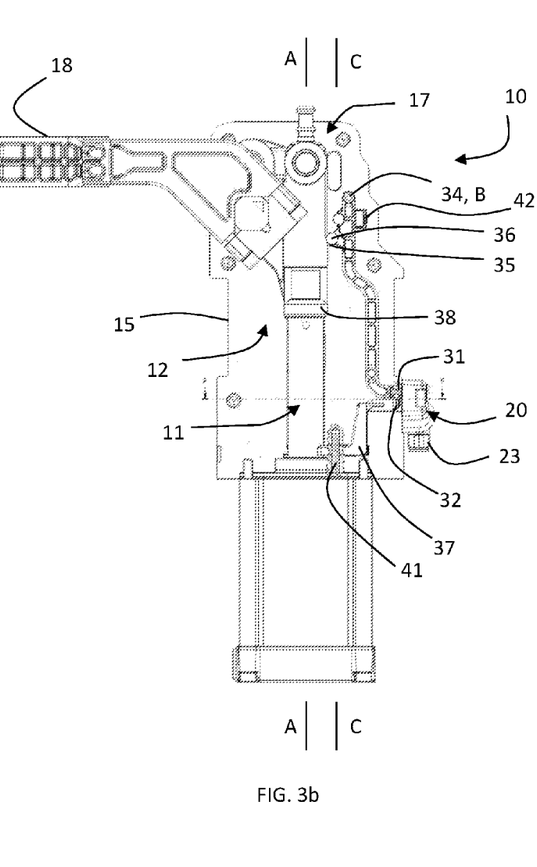

As shown in detail in FIGS. 3a and 3b, the actuating element 11 is coupled to a first 31 and a second 32 triggering part so that when the actuating element 11 is positioned at the first end position 12, the first triggering part 31 is positioned at a first sensing position and, when the actuating element 11 is positioned at the second end position 13, the second triggering part 32 is positioned at a second sensing position defined by the sensing elements 21.

The first triggering part 31 is carried by a first leverage 33 pivotably connected to the device housing 15 at a first pivot 34 so as to rotate about a first axis of rotation B perpendicular to the sliding movement of the actuating element 11.

The first leverage 33 comprises a rotating pin 36 which rests against the actuating element 11. In detail, the outer surface of the fork linkage defines a cam guide 35 which cooperates with the rotating pin 36 in such a way that movement of the fork linkage urges the first leverage 31 to rotate about the first pivot 34 towards the housing 15 wall. This movement of the first leverage 33 brings the first triggering part 31 at the first sensing position in front of the first reading opening 16a.

Furthermore, the first leverage 33 cooperates with first elastic means 42 which cause the return of the first triggering part 31 into its initial position (away from the respective sensing position), when the actuating element 11 leaves the first end position 12 and moves towards its second end position 13, namely when the cam guide 35 does not urge anymore the rotating pin 36 towards the housing 15 wall.

The second triggering part 32 is carried by a second leverage 37 pivotably connected to the device housing 15 at a second pivot 41 so as to rotate about a second axis of rotation C parallel to the sliding movement of the actuating element 11.

Figure 4A:
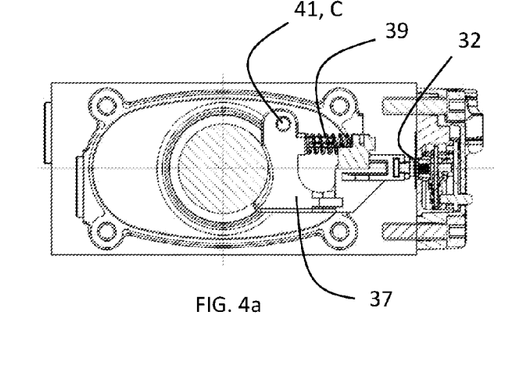
FIGS. 4a and 4b are sectional views along lines E-E and F-F of FIGS. 3a and 3b, respectively.
Figure 4B:
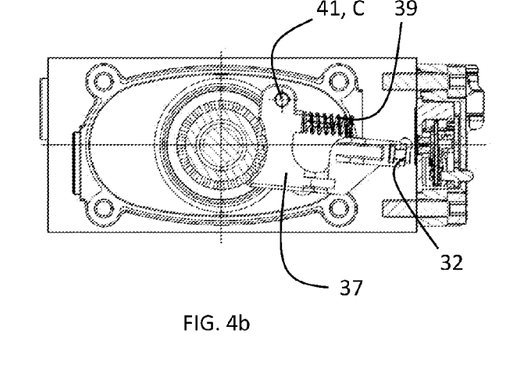

When the actuating element 11 reaches its second end position 13, a portion 38 of the piston rod having increased outer diameter interferes with the second leverage 37 so as to urge it against the action of second elastic means 39, shown in detail in FIGS. 4a and 4b. This causes the second triggering part 32 to be moved towards the second sensing position in front of the second reading opening 16b.

When the actuating element 11 leaves its second end position 13, the portion 38 with increased diameter gets off the second leverage 37. So, the second leverage 37 can return to its initial position under the action of the second elastic means 39 and the second triggering part 32 leaves the second sensing position.

With regard to FIGS. 6a to 6d, the sensor 20 further comprises a connector 23 constrained to the sensor body 22 by means of a screw 25.

Figure 5A:
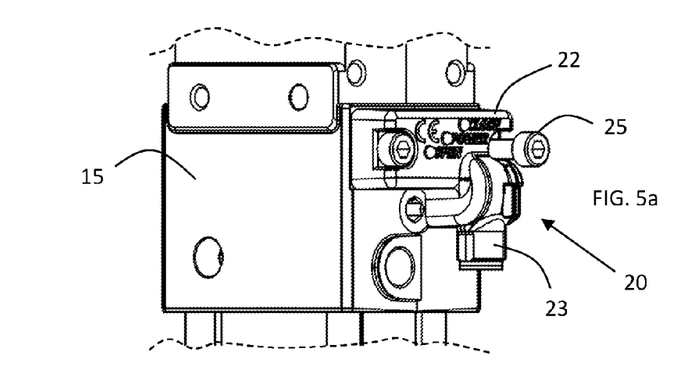
FIGS. 5a and 5b are partial perspective views of the sensor mounted on the housing of the actuating device of FIG. 1a, with the connector oriented according to a first and a second angle, respectively.
Figure 5B:
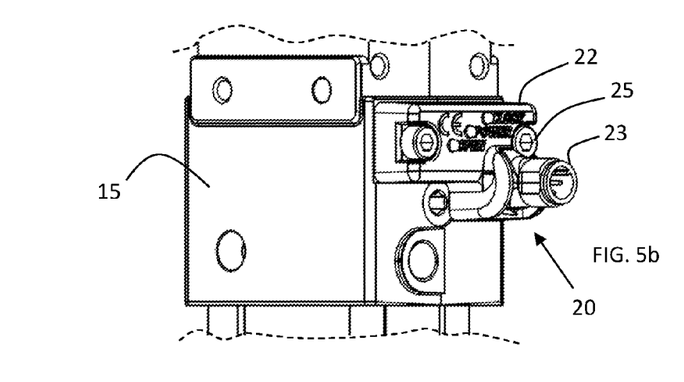

The connector 23 is mounted on the sensor body 22 so as to be fixed to the same 22 according to a plurality of orientations varying within an angle of 90°. FIGS. 5a and 5b respectively show the two outmost orientations.

To achieve the above flexibility in setting the most suitable orientation of the connector 23, the surface of the connector which couples with the sensor body 22 comprises a curved nose 26 which cooperates with a complementary guiding groove 24 obtained on the sensor body 22 in order to retain the connector 23, but at the same time allow reciprocal rotation between the connector 23 and the sensor body 22. In detail, both the curved nose 26 and the guiding groove 24 develop along an angular portion, which in the depicted embodiment is of 90°.

Furthermore, the connector 23 comprises on its outer surface a curved nut 27 shaped so as to cooperate with the head 25a of the screw 25 in order to define a plurality of stable connections between the connector 23 and the sensor body 22.

In detail, the curved nut 27 has a development extending parallel to the curved nose 26 and, at predefined angular positions, it defines a plurality of seats 27a adapted to house at least a portion of the screw head 25a.

Figure 6A:
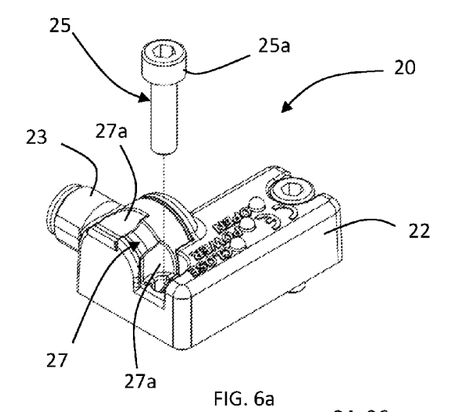
FIGS. 6a to 6d are an exploded perspective view, a plan view and two sectional views along lines A-A and D-D, respectively.
Figure 6B:
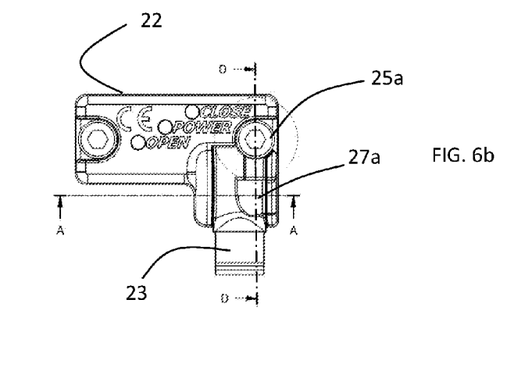
Figure 6C:
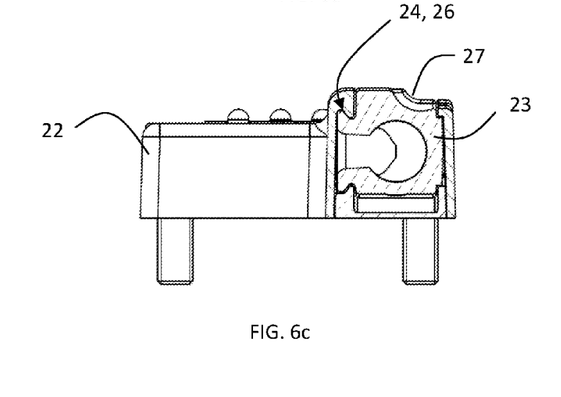
Figure 6D:
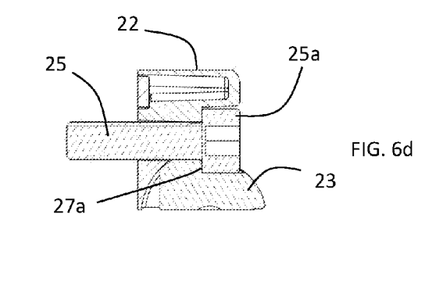

In the embodiment depicted in FIGS. 6a to 6b, the curved nut 27 comprises a seat 27a at each of its end positions. This allows stably connecting the connector 23 to the sensor body 22 at two orientations inclined by 90° one with respect to the other. Nevertheless, stable connections are possible also at different orientations at which the screw head 25a acts against the surface of the curved nut 27 outside the seats 27a.

Figure 7A:
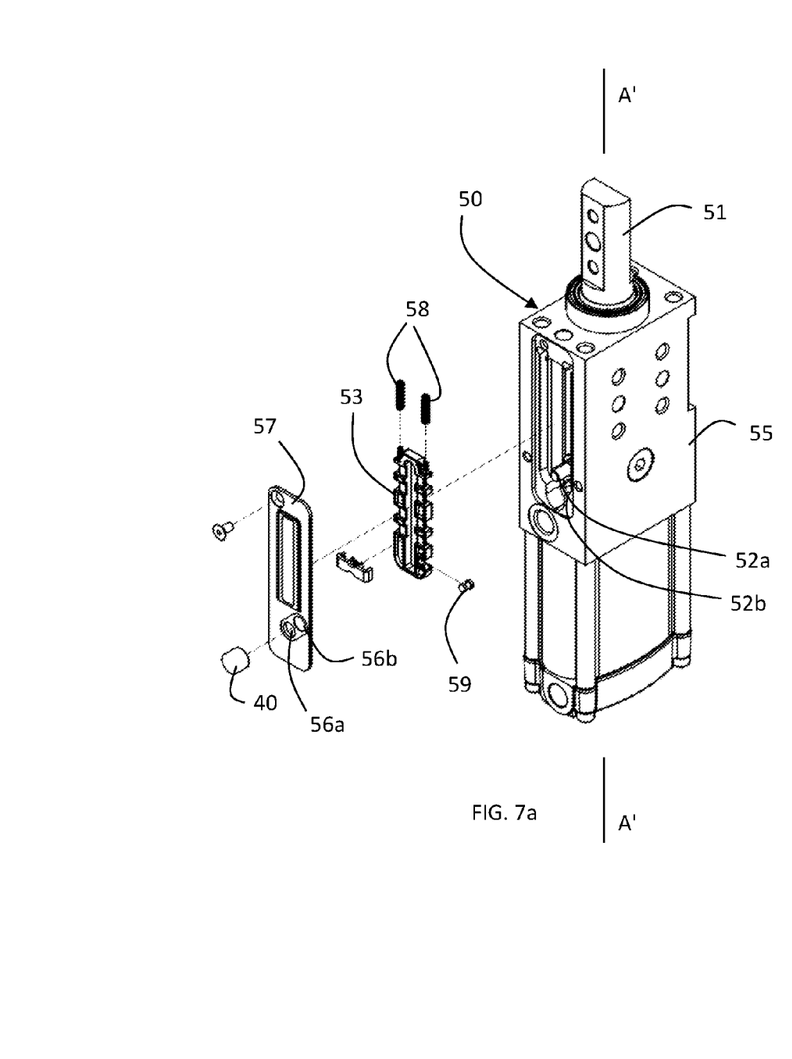
FIGS. 7a and 7b are perspective exploded views of details of a second embodiment of the actuating device according to the invention.
Figure 7B:
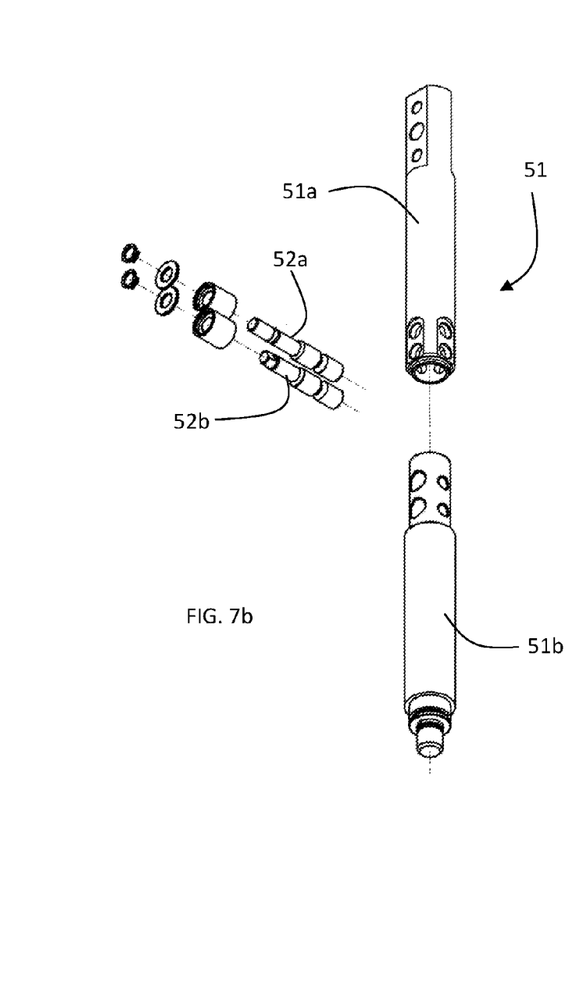

In FIGS. 7a and 7b a second embodiment of an actuating device according to the present invention is globally indicated with 50. The actuating device according to the second embodiment is a retractable locating pin unit 50.

The pin unit 50 comprises a housing 55 inside of which an actuating element 51 is provided, wherein the actuating element is a two-part rod. The two parts 51a, 51b of the rod 51 are connected to each other by means of two fastening pins 52a,52b. The two-part rod 51 is linearly displaceable along a sliding axis A', between a first operative and a second non-operative position.

The pin unit 50 also comprises sensing means (not shown) for revealing the positioning of the two-part rod 51 at its first or second end position, which are substantially the same as described with reference to the first embodiment.

The sensor is constrained to the device housing 55 at two reading openings 56a,56b obtained in a plate 57 constrained to the housing 55 so as to define two sensing positions placed inside the housing 55, in front of the respective reading openings 56a,56b.

Also according to the second embodiment, the reading openings 56a,56b are sealed with a cover 40 made of a material adapted, on the one hand, to allow the sensing elements to define sensing positions placed inside the device housing 55 and, on the other hand, to assure a proper and permanent sealing of the housing 55.

The first triggering part coupled to the two-part rod 51 is one of the fastening pins 52a which protrudes from the two-part rod 51 towards the side of the housing 55 to which the plate 57 carrying the reading openings 56a,56b is fastened.

When the two-part rod 51 is in its non-operative position, the fastening pin 52a is positioned at a first sensing position, inside the housing 55, in front of the first reading opening 56a.

The second 59 triggering part is carried by a slide 53 slidably constrained to the device housing 55 behind the plate 57. The slide 53 is urged into a rest position by means of elastic means 58. When the slide 53 is in its rest position, the second triggering part 59 is outside the second sensing position which is located inside the housing 55, in front of the second reading opening 56b.

When the two-part rod 51 moves towards its operative position, the fastening pin 52a is moved away from the first sensing position. When the two-part rod 51 reaches its operative position, the fastening pin 52a engages the slide 53 and drags it against the force of the elastic means 58. This movement of the slide 53 brings the second triggering part 59 into the second sensing position.

When the two-part rod 51 moves back towards its non-operative position, the fastening pin 52a disengages from the slide 53 and the elastic means 58 urge it 53 (and consequently the second triggering part 59) back into its rest position away from the second sensing position.

Figure 8A:
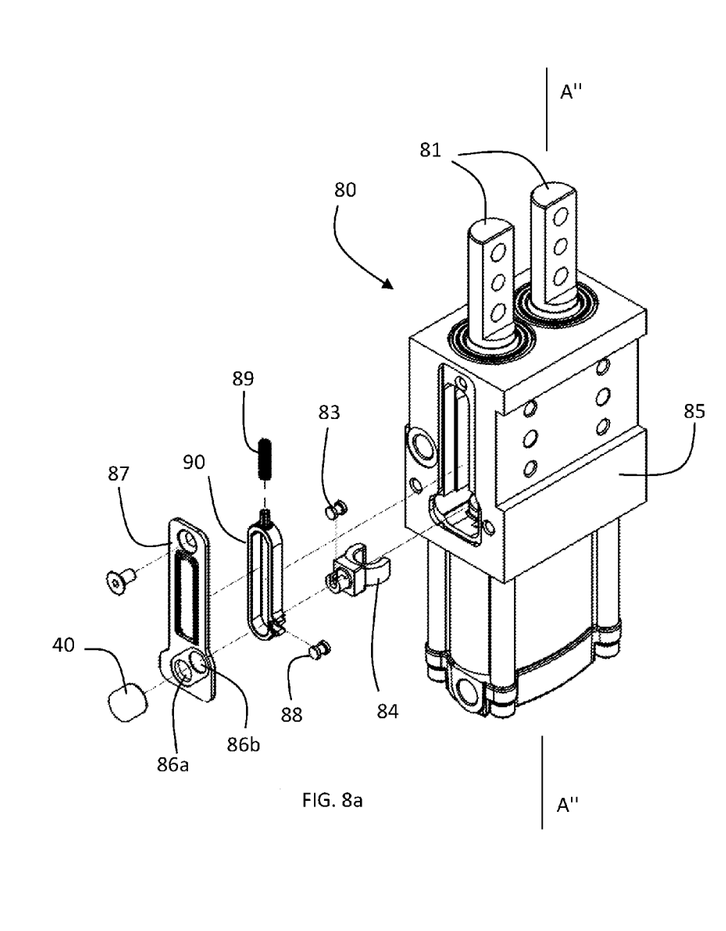
FIGS. 8a and 8b are perspective exploded views of details of a third embodiment of the actuating device according to the invention.
Figure 8B:
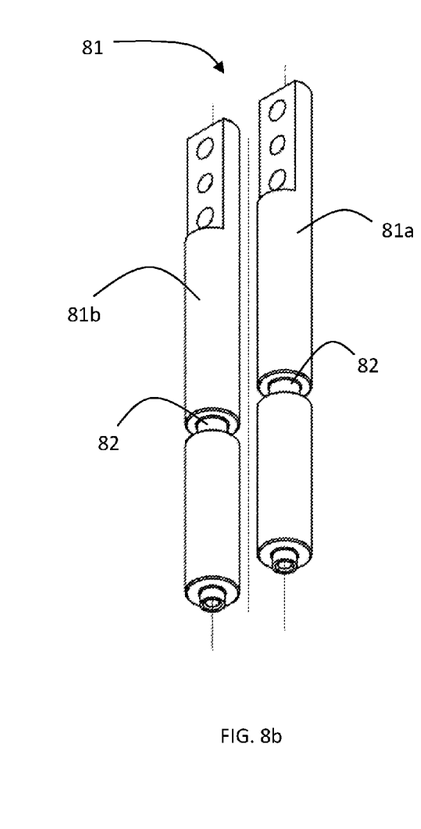

In FIGS. 8a and 8b a third embodiment of an actuating device according to the present invention is globally indicated with 80. The actuating device according to the third embodiment is a double-rod pin unit 80.

The pin unit 80 comprises a housing 85 inside of which an actuating element 81 is provided, wherein the actuating element is a double rod linearly displaceable along a sliding axis A" between a first operative and a second non-operative position.

The pin unit 80 also comprises sensing means (not shown) for revealing the positioning of the double rod 81 at its first or second end position, which are substantially the same as described with reference to the first embodiment.

The sensor is constrained to the device housing 85 at two reading openings 86a,86b obtained in a plate 87 constrained to the housing 85 so as to define two sensing positions placed inside the housing 85, in front of the respective reading openings 86a,86b.

Also according to the third embodiment, the reading openings 86a,86b are sealed with a cover 40 made of a material adapted, on the one hand, to allow the sensing elements to define sensing positions placed inside the device housing 85 and, on the other hand, to assure a proper permanent sealing of the housing 85.

The two rods 81a,81b of the double rod 81 comprise each a circular slit 82. The first triggering part 83 is connected to one of the two rods 81a,81b by means of a half-annular connector 84 engaged with the rod slit 82. The first triggering part 83 is connected to one of the two rods 81a,81b in a way so as to protrude towards the side of the housing 85 to which the plate 87 carrying the reading openings 86a,86b is fastened.

When the two rods 81a,81b are in their non-operative position, the triggering part 83 is positioned at a first sensing position, inside the housing 85, in front of the first reading opening 86a.

The second triggering part 88 is carried by a slide 90 slidably constrained to the device housing 85 behind the plate 87. The slide 90 is urged into a rest position by means of elastic means 89. When the slide 90 is in its rest position, the second triggering part 88 is outside the second sensing position which is located inside the housing 85, in front of the second reading opening 86b.

When the two rods 81a,81b move towards their operative position, the first triggering part 83 is moved away from the first sensing position. When the two rods 81a,81b reach their operative position, the first triggering part 83 engages the slide 90 and drags it against the force of the elastic means 89. This movement of the slide 90 brings the second triggering part 88 into the second sensing position.

When the two rods 81a,81b move back towards their non-operative position, the first triggering part 83 disengages from the slide 90 and the elastic means 89 urge it 90 (and consequently the second triggering part 88) back into its rest position away from the second sensing position.

The invention claimed is:

1. An actuating device comprising:
a housing inside of which an actuating element is provided, the actuating element being slidably displaceable along a first axis between a first operative position and a second non-operative position and sensing means adapted to detect the positioning of the actuating element at least one of the first or the second position;
the actuating element being coupled to at least one triggering part so that a positioning of the actuating element at one of the first or the second position corresponds to the positioning of the at least one triggering part at at least one sensing position;
the housing comprising at least one reading opening through which the positioning of at least one triggering part at the at least one sensing position can be detected;
the sensing means comprising sensor at least one sensing element associated with the at least one sensing position in order to detect the positioning of at least one triggering part at the at least one sensing position, the sensing means being placed outside the housing and being connected to the same at the reading opening;
wherein the at least one triggering part is completely housed inside the housing and the at least one reading opening is sealed with a cover made of a material adapted to allow the detection of the triggering part when placed at the at least one sensing position.

2. The actuating device (according to claim 1, wherein the cover (40) is made of non-magnetic material preferably.

3. The actuating device according to claim 1, wherein the cover is made of an adhesive material preferably.

4. The actuating device according to claim 1, wherein the actuating element is coupled to two triggering parts movable towards and away from a respective first and second reading opening, each reading opening being coupled to a sensing element of the sensing means thereby defining a sensing position.

5. The actuating device according to claim 1, wherein the sensing means comprise two sensing elements placed out of alignment with respect of both, a vertical and a horizontal axis.

6. The actuating device according to claim 5, wherein the two sensing elements are placed along a line inclined diagonally with respect to the horizontal and vertical axis.

7. The actuating device according to claim 1, wherein the sensing means comprise a sensor body to which a connector for signal extraction is fixed by means of a screw, wherein the connector is adapted to be fixed to the sensor body according to a plurality of orientations.

8. The actuating device according to claim 7, wherein the connector comprises a curved nut shaped so as to cooperate with a head of the screw in order to define a plurality of stable connections between the connector and the sensor body.

9. The actuating device according to claim 8, wherein the curved nut defines a plurality of seats adapted to house at least a portion of the screw head.

10. The actuating device according to claim 7, wherein the sensor body comprises a guiding groove) which rotatably engages with the connector in order to allow reciprocal rotation between the connector and the sensor body when the screw is not fastened.

11. The actuating device according to claim 1, wherein the at least one triggering part is carried by at least one leverage pivotably connected to the housing, the movement of the actuating element causing the at least one leverage to rotate.

12. The actuating device according to claim 11, wherein a first triggering part is carried by a first leverage pivotably connected to the housing so as to rotate about a first axis of rotation perpendicular to the sliding movement of the actuating element and/or a second triggering part is carried by a second leverage pivotably connected to the housing so as to rotate about a second axis of rotation parallel to the sliding movement of the actuating element.

13. The actuating device according to claim 12, wherein the first leverage cooperates with a cam guide defined by the outer surface of the actuating element, wherein the displacement of the first leverage along the cam guide sets the first leverage into rotation and/or the second leverage cooperates with a portion of the actuating element having increased outer diameter which urges the second leverage against the action of elastic means when the actuating element reaches at least one of the first or the second position.

14. The actuating device according to claim 13, wherein the first leverage comprises a rotating pin engaging with the cam guide and/or the portion with increased outer diameter is positioned at an axial position of the actuating element and extends along an annular portion.

15. The actuating device according to claim 13, wherein the first leverage cooperates with elastic means for returning into a rest position when disengaged from the cam guide.

16. The actuating device according to claim 1, wherein the actuating device is a clamping unit and the actuating element comprises a piston rod connected to a fork linkage, wherein the group made of the piston rod and the fork linkage act on an articulated lever or cam mechanism for actuating the rotation of a pivotable arm.

17. The actuating device according to claim 1, wherein the actuating element is a two-part rod and the at least one triggering part is a fastening pin of the two-part rod.

18. The actuating device according to claim 17, wherein the fastening pin is moved by the two-part rod between the first sensing position and an engagement position in which the fastening pin cooperates with a slide carrying a second triggering part and moves the slide to an end position in which the second triggering part is placed at the second sensing position.

19. The actuating device according to claim 1, wherein the actuating element is at least one slidable rod comprising a circular slit and the at least one triggering part is connected to the at least one slidable rod by means of a half annular connector engaged with the rod slit.

20. The actuating device according to claim 19, wherein the at least one triggering part is movable between the first sensing position and an engagement position in which it cooperates with a slide carrying a second triggering part and moves the slide to an end position in which the second triggering part is placed at the second sensing position.

21. The actuating device according to claim 2, wherein the non, magnetic material is a non-metallic material.

22. The actuating device according to claim 3, wherein the adhesive material is an acrylic material.

23. The actuating device according to claim 6, wherein the line inclined diagonally with respect to the horizontal and vertical axis is inclined by 45° or 60°.

24. The actuating device according to claim 13, wherein the first leverage comprises a rotating pin engaging with the cam guide and/or the portion with increased outer diameter is positioned at an axial position of the actuating element and extends all around the actuating element.

* * * * *